US011567856B2

(12) United States Patent
Pallapolu et al.

(10) Patent No.: US 11,567,856 B2
(45) Date of Patent: Jan. 31, 2023

(54) SECURED CODE ASSIGNMENT AND REVIEW ENGINE

(71) Applicant: BANK OF AMERICA CORPORATION, Charlotte, NC (US)

(72) Inventors: Kalyan Chakravarthy Pallapolu, Telangana (IN); Srinath Nelakuditi, Telangana (IN); Satti Rajeswara Seshareddy, Andhra Pradesh (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/352,689

(22) Filed: Jun. 21, 2021

(65) Prior Publication Data
US 2022/0405195 A1 Dec. 22, 2022

(51) Int. Cl.
G06F 9/44 (2018.01)
G06F 11/36 (2006.01)

(52) U.S. Cl.
CPC .................. G06F 11/3672 (2013.01)

(58) Field of Classification Search
None
See application file for complete search history.

(56) References Cited

U.S. PATENT DOCUMENTS

| 6,807,633 | B1 * | 10/2004 | Pavlik | H04L 9/3247 713/180 |
| 9,595,009 | B2 * | 3/2017 | Haynes | G06Q 10/00 |
| 2014/0196010 | A1 * | 7/2014 | Balachandran | G06F 8/71 717/124 |
| 2014/0331203 | A1 * | 11/2014 | Elshishiny | G06F 11/3676 717/124 |
| 2017/0031800 | A1 * | 2/2017 | Shani | G06F 11/34 |
| 2017/0075790 | A1 * | 3/2017 | Macleod | G06F 11/3668 |
| 2020/0327548 | A1 * | 10/2020 | Hartard | G06Q 20/12 |
| 2020/0394588 | A1 * | 12/2020 | Sanchez | G06Q 10/063114 |
| 2021/0089278 | A1 * | 3/2021 | Dunn | G05B 19/05 |
| 2021/0279577 | A1 * | 9/2021 | West | G06N 3/0445 |

OTHER PUBLICATIONS

OpenCirrus, "What is Distributed Computing, its Pros and Cons?", Sep. 2018 (Year: 2018).*

* cited by examiner

*Primary Examiner* — Wei Y Zhen
*Assistant Examiner* — Lanny N Ung
(74) *Attorney, Agent, or Firm* — Moore & Van Allen PLLC; James C. Edwards (57) ABSTRACT

An intelligent determination of code change review assignments and subsequent secured access to the determined assignments. Code changes undergo code change complexity determination which is based on (i) a level of importance of the module(s) in which the changes occur, (ii) the volume of metadata files impacted by the code changes, and (iii) the dependency of the code changes on external modules. A distributed trust computing network is implemented and a code change smart contract which relies on smart contract rules is used to determine and allocate code change review assignments. In this regard, data blocks within a distributed ledger define individual segments/portions of the code change file with each data block identifying a code change review assignment.

19 Claims, 7 Drawing Sheets

| MODULE | LEVEL OF IMPORTANCE OF MODULE WITH RESPECT TO APPLICATION (A) | VOLUME OF METADATA FILES IMPACTED BY CODE CHANGES (B) | DEPENDENCY OF CODE CHANGES ON EXTERNAL MODULES (C) | OVERALL COMPLEXITY WEIGHTAGE OF THE MODULE (A + B + C / 3) |
|---|---|---|---|---|
| MODULE 1 | 5 | 4 | 2 | 4 |
| MODULE 2 | 10 | 6 | 4 | 6 |
| MODULE 3 | 7 | 11 | 4 | 7 |
| MODULE 4 | 10 | 1 | 6 | 6 |
| MODULE 5 | 6 | 9 | 9 | 8 |

SECURED CODE ASSIGNMENT AND REVIEW ENGINE

FIELD OF THE INVENTION

The present invention is generally directed to processing changes to computer code and, more specifically, intelligently determining code review assignments for computer code changes based at least on a determined complexity of the code changes and securely providing the code review assignments to the reviewers.

BACKGROUND

In large enterprises certain computing applications have widespread use across multiple different lines of business, divisions or the like. As the use of such applications have increased, so to has the complexity and functionality of the applications. The complexity and functionality of the applications is exhibited within multiple modules (i.e., a software component or part of an application that includes one or more routines or the like).

As the use of such computing applications across multiple lines of business increases, so too does the number of development teams revising or otherwise making changes to the computing application. With multiple different development teams simultaneously working on a computing application the probability greatly increases that code changes, otherwise referred to as code revisions, will conflict. For example, one developer's code change may be inconsistent with another developer's changes. Moreover, one developer's code changes may have an impact on other internal or external modules, which have a dependency to the module being changed.

Therefore, a need exists to have a robust mechanism to control code change review assignments to ensure that the review assignment is assigned to a reviewer capable of reviewing the code changes. In this regard, intelligent code change review assignment should take into account the complexity of the code changes, as well as, the modules in which the code changes occur and the internal and external modules that are dependent upon the module(s) in which the code changes occur. Further, the intelligent code change review assignment should provide a heightened level of code change review assignment validity and security, to ensure that the assignments are accurate and that only assigned reviewers have access to the code changes that they have been assigned.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an intelligent determination of code change review assignments and secured access to the determined code change review assignments. In embodiments of the invention, code changes undergo code change complexity determination which is based at least on (i) a level of importance of the module(s) in which the changes occur in relation to the computing application, (ii) the volume/quantity of metadata files impacted by the code changes, and (iii) the dependency of the code changes on other external modules/computing applications. In specific embodiments of the invention the code change complexity determination is the basis for determining the number/volume of code change review assignments and/or the type of reviewer to which the code change review assignment is assigned.

Additionally, embodiments of the present invention implement a distributed trust computing network, otherwise referred to as a blockchain network, and a code change smart contract which relies on a plurality of smart contract rules to determine and allocate code change review assignments. In this regard, data blocks within a distributed ledger define verified individual segments/portions of the code change file with each data block having a verified code change review assignment.

In other specific embodiments of the invention, the code changes undergo a logical code comparison to the current/existing computer application to identify, based on code indices, the module(s) in which the code changes occur. In further embodiments of the invention, the code changes undergo a logical compliance check to ensure that the code changes are compliant to coding standards. Moreover, specific embodiments of the invention provide for identifying code resolutions (i.e., so-called "fixes") for non-compliant code changes and implementing the code resolutions so as to autocorrect the code changes prior to determining the complexity of the code changes.

Additionally, specific embodiments of the invention provide for secured access to code changes through application of cryptography means prior to communicating the code changes to the distributed trust computing network. Specifically, a previously determined complexity value may serve as an input to a hash algorithm for generating a hash value, which is used to generate a private encryption key. The private encryption key is used to digitally sign the code change file and the data blocks of the distributed ledger. A reviewer assigned to review the code changes or segments/portions thereof possesses the capability to generate a private encryption key, the hash value of which must match the hash value of the private key in order for the reviewer to gain access to the code changes (i.e., the data blocks of the distributed ledger containing the assigned code changes or assigned segments of the code change file).

A system for secured computing code review assignment defines first embodiments of the invention. The system includes a computing platform having a first memory and one or more first processing devices in communication with the memory. The first memory stores code change complexity determination engine that is executable by the one or more first processing devices. The code change complexity determination engine is configured to receive code changes for a computer application having a plurality of modules, in which the code changes occur in at least one of the modules. The code change complexity determination engine is further configured to determine a complexity value for the code changes based at least on (i) a level of importance of the at least one of the modules with respect to the computer application, (ii) quantity of metadata files impacted by the code changes, and (iii) dependency of the code changes on external computing applications.

The system additionally includes a distributed trust computing network having a plurality of decentralized nodes. Each decentralized node includes a second memory and at least one second processing device in communication with the second memory. The second memory stores a code assignment smart contract that is executable by the second processing devices. The assignment smart contract is configured, in response to the distributed trust computing network receiving the code changes and the complexity value, execute logic in the smart contract based on a plurality of smart contract rules to determine segments of the code changes and a code review assignment for each segment of the code changes. In response the distributed trust computing network is configured to generate a plurality of data blocks within a distributed register. Each data block including a determined segment of the code changes and identifying the code review assignment for the corresponding segment of the code changes. A plurality of the decentralized nodes validate the plurality of data blocks on the distributed ledger.

In specific embodiments the system additionally includes a code change comparison engine that is stored in the first memory and executable by the one or more first processing devices. The code change comparison engine is configured to compare the code changes to currently existing code of the computer application to identify, from the code index, the at least one of the modules in which the code changes occur.

In further specific embodiments the system includes a code change compliance engine that is stored in the first memory and executable by the first processing device. The code change compliance engine is configured to (i) scan the code changes with coding standards to determine whether the code changes are compliant with the coding standards, and (ii) in response to determining that the code changes are compliant with the coding standards, communicate the code changes to the code change complexity determination engine. In related embodiments of the system, the code change compliance engine is further configured to, in response to scanning the code changes and identifying one or more non-compliances, (iii) identify a coding resolution for the one or more non-compliances, and (iv) implementing the coding resolution to auto-correct the one or more non-compliances. In other related embodiments of the system, the code change compliance engine is a self-learning engine configured to identify addition of new modules to the computing application and updated or new coding standards.

In still further specific embodiments of the system, the code change complexity engine is further configured to determine at least one (i) a quantity of code review assignments for the code changes, and (ii) a type of code reviewer for the code review assignment.

Moreover, in further embodiments the system includes a cryptography engine that is stored in the first memory and executable by the first processing device. The cryptography engine is configured to (i) receive the complexity value as an input to a hash algorithm, (ii) generate a first hash value as a result of executing the hash algorithm, (iii) generate a private encryption key based on the first hash value, and (iv) digitally sign the code changes with the private encryption key prior to communicating the code changes to the distributed trust computing network. In related embodiments of the system, the code assignment smart contract is further configured to digitally sign each of the data blocks with the private key. Further, the reviewer assigned to review the segment of the code changes implements a public key and the hash algorithm to generate a second hash value and validates the digital signature of assigned data blocks based on the first and second hash values being equivalent.

In still further specific embodiments of the system, the plurality of smart contract rules include one or more of (i) a rule associated with a history of the objects and classes in the computer application, (ii) a rule based on a complexity of the code changes, (iii) a rule based on the dependency of the modules in the computer application to other external modules in other external computing applications, and (iv) a rule based on code change types being a basis for code review assignment.

In additional specific embodiments of the system, the computer application is further defined as a Customer Relationship Management (CRM) application.

A computer-implemented method for secured computing code review assignment defines second embodiments of the invention. The method is executed by one or more processing devices. The method includes receiving code changes for a computer application having a plurality of modules, in which the code changes occur in at least one of the modules. The method further includes determining a complexity value for the code changes based at least on (i) a level of importance of the at least one of the modules with respect to the computer application, (ii) quantity of metadata files impacted by the code changes, and (iii) dependency of the code changes on external computing applications. The method further includes, in response to a distributed trust computing network receiving the code changes and the complexity value, executing logic in a smart contract that is based on a plurality of smart contract rules to determine segments of the code changes and a code review assignment for each segment of the code changes. In addition, the method includes generating a plurality of data blocks within a distributed register, each data block including a determined segment of the code changes and identifying the code review assignment for the corresponding segment of the code changes. A plurality of the decentralized nodes validate the plurality of data blocks on the distributed ledger.

In specific embodiments the method further includes comparing the code changes to currently existing code of the computer application to identify, from the code index, the at least one of the modules in which the code changes occur.

In other specific embodiments the method further includes scanning the code changes with coding standards to determine whether the code changes are compliant with the coding standards, and, in response to determining that the code changes are compliant with the coding standards, communicate the code changes to the code change complexity determination engine. In related embodiments the method includes identifying one or more non-compliances in the code changes, identifying a coding resolution for the one or more non-compliances, and implementing the coding resolution to auto-correct the one or more non-compliances.

In still further specific embodiments the method includes determining, based on the complexity value, at least one (i) a quantity of code review assignments for the code changes, and (ii) a type of code reviewer for the code review assignment.

In further specific embodiments of the method, the plurality of smart contract rules include one or more of (i) a rule associated with a history of the objects and classes in the computer application, (ii) a rule based on a complexity of the code changes, (iii) a rule based on the dependency of the modules in the computer application to other external modules in other external computing applications, and (iv) a rule based on code change types being a basis for code review assignment.

A computer program product including a non-transitory computer-readable medium defines third embodiments of the invention. The computer-readable medium includes a first set of codes for causing a computer to receive code changes for a computer application having a plurality of modules, in which the code changes occur in at least one of the modules. The computer-readable medium additionally includes a second set of codes for causing a computer to determine a complexity value for the code changes based at least on (i) a level of importance of the at least one of the modules with respect to the computer application, (ii) quantity of metadata files impacted by the code changes, and (iii) dependency of the code changes on external computing applications. Further, the computer-readable medium includes a third set of codes for causing a computer to, in response to a distributed trust computing network receiving the code changes and the complexity value, execute logic in a smart contract that is based on a plurality of smart contract rules to determine segments of the code changes and a code review assignment for each segment of the code changes, In addition, the computer-readable medium includes a fourth set of codes for causing the computer to generate a plurality of data blocks within a distributed register, each data block including a determined segment of the code changes and identifying the code review assignment for the corresponding segment of the code changes. A plurality of the decentralized nodes validate the plurality of data blocks on the distributed ledger.

In specific embodiments of the computer program product, the computer-readable medium further includes a fifth set of codes for causing a computer to compare the code changes to currently existing code of the computer application to identify, from the code index, the at least one of the modules in which the code changes occur, and a sixth set of codes for causing a computer to (i) scan the code changes with coding standards to determine whether the code changes are compliant with the coding standards, and (ii) in response to determining that the code changes are compliant with the coding standards, communicate the code changes to the code change complexity determination engine. In related embodiments of the computer program product, the sixth set of codes are further configured to cause the computer to identify one or more non-compliances in the code changes, identify a coding resolution for the one or more non-compliances, and implement the coding resolution to auto-correct the one or more non-compliances.

In other specific embodiments of the computer program product, the computer-readable medium further includes a fifth set of codes for causing a computer to determine, based on the complexity value, at least one (i) a quantity of code review assignments for the code changes, and (ii) a type of code reviewer for the code review assignment.

Thus, according to embodiments of the invention, which will be discussed in greater detail below, the present invention provides for an intelligent determination of code change review assignments and subsequent secured access to the determined code change review assignments. Specifically, code changes undergo code change complexity determination which is based at least on (i) a level of importance of the module(s) in which the changes occur in relation to the computing application, (ii) the volume/quantity of metadata files impacted by the code changes, and (iii) the dependency of the code changes on other external modules/computing applications. In specific embodiments of the invention the code change complexity determination is the basis for determining the number/volume of code change review assignments and/or the type of reviewer to which the code change review assignment is assigned. Additionally, a distributed trust computing network is implemented and a code change smart contract which relies on a plurality of smart contract rules is used to determine and allocate code change review assignments. In this regard, data blocks within a distributed ledger define individual segments/portions of the code change file with each data block having a code change review assignment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

"User" as used herein refers to an individual who may interact with the system to access the functions therein. Specifically, according to embodiments of the present invention, a user may be individual that reviews code changes tests (i.e., a code change reviewer). Accordingly, the user may be an agent, employee, associate, contractor, or other authorized party who may access, use, administrate, maintain, and/or manage the computing systems within the computing system.

"Distributed trust computing network" otherwise commonly referred to as a blockchain network, as used herein refers to a network of decentralized computing devices, referred to as nodes. The nodes are configured to converge, otherwise referred to as come to a consensus, on data that is being added to a distributed register/ledger hosted within the distributed trust computing network to verify the authenticity of such data (i.e., the trust computing network acts as a source of truth). Once authenticated the data forms a data block which is added to the distributed register/ledger.

"Distributed register," which is also be referred to as a "distributed ledger," as used herein refers to a structured list of data records that is decentralized and distributed amongst a plurality of computing systems and/or devices. In some embodiments, the distributed register/ledger may use a linked block structure, commonly referred to as a block chain.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

"Node" as used herein may refer to a computing system on which the distributed register/ledger is hosted. In some embodiments, each node maintains a full copy of the distributed register/ledger. In this way, even if one or more nodes become unavailable or offline, a full copy of the distributed register/ledger may still be accessed via the remaining nodes in the distributed trust computing network. That said, in some embodiments, the nodes may host a hybrid distributed register/ledger such that certain nodes may store certain segments of the linked block register but not others. Specific to the present invention, each node in the distributed trust computing network is associated with a computing environment entity that is determinative of the computing environment stability.

Thus, systems, apparatus, and methods are described in detail below that provide for an intelligent determination of code change review assignments and secured access to the determined code change review assignments. In embodiments of the invention, code changes undergo code change complexity determination which is based at least on (i) a level of importance of the module(s) in which the changes occur in relation to the computing application, (ii) the volume/quantity of metadata files impacted by the code changes, and (iii) the dependency of the code changes on other external modules/computing applications. In specific embodiments of the invention the code change complexity determination is the basis for determining the number/volume of code change review assignments and/or the type of reviewer to which the code change review assignment is assigned.

Additionally, embodiments of the present invention implement a distributed trust computing network, otherwise referred to as a blockchain network, and a code change smart contract which relies on a plurality of smart contract rules to determine and allocate code change review assignments. In this regard, data blocks within a distributed ledger define individual segments/portions of the code change file with each data block having a code change review assignment.

In other specific embodiments of the invention, the code changes undergo a logical code comparison to the current/existing computer application to identify, based on code indices, the module(s) in which the code changes occur.

In other specific embodiments of the invention, the code changes undergo a logical compliance check to ensure that the code changes are compliant to coding standards. Moreover, specific embodiments of the invention provide for identifying code resolutions (i.e., so-called "fixes") for non-compliant code changes and implementing the code resolutions so as to autocorrect the code changes prior to determining the complexity of the code changes.

Additionally, specific embodiments of the invention provide for secured access to code changes through application of cryptography means within the distributed trust computing network. Specifically, a previously determined complexity value serves as an input to a hash algorithm for generating a hash value, which is used to generate a private encryption key. The private encryption key is used to digitally sign the code change file and the data blocks of the distributed ledger. A reviewer assigned to review the code changes or segments/portions thereof possesses the capability to generate a public encryption key, the hash value of which must match the hash value of the private key in order for the reviewer to gain access to the code changes (i.e., the data blocks of the distributed ledger containing the assigned code changes or assigned segments of the code change file).

Figure 1:
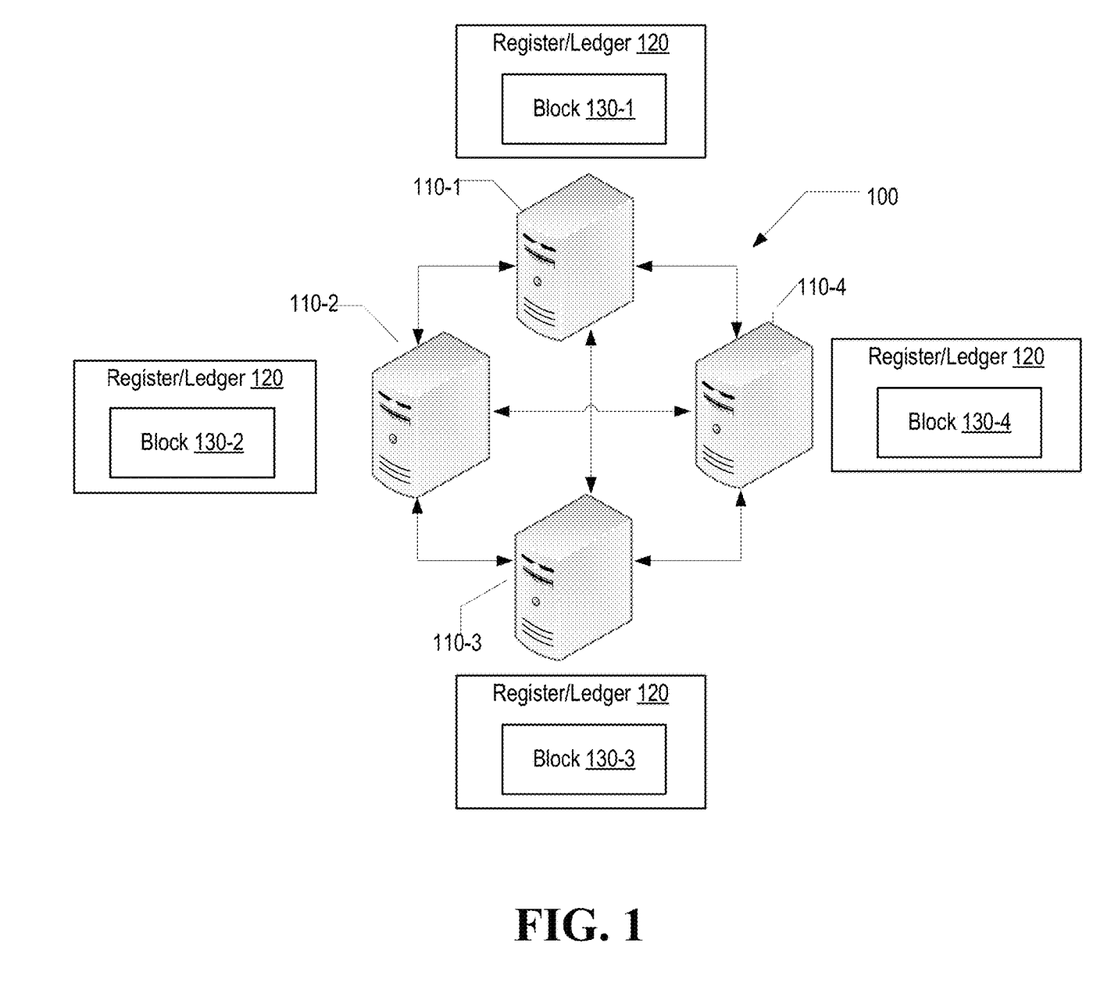
FIG. 1 is a schematic diagram of a distributed trust computing network and a corresponding distributed register/ledger having multiple data blocks, in accordance with embodiments of the present invention.

Referring to FIG. 1 a schematic diagram of an exemplary distributed trust computing network 100 is depicted, in accordance with embodiments of the present invention. The distributed trust computing network 100, in other instances referred to a blockchain network, is a distributed database that maintains, e.g., a list of data records, or the like. In specific embodiments of the invention the data records may include universal tags linked to data files, which are verified by the distributed trust computing network in terms of (i) the authenticity of the code change file or segment of the code change file, and/or (ii) the user/reviewer assigned to the code change file or segment of code change file. The security of the data maintained within the trust network is enhanced by the distributed nature of the network. The distributed trust computing network 100 typically includes several decentralized nodes 110-1, 110-2, 110-3, 110-4, which may be one or more systems, machines, computers, databases, data stores or the like operably connected with one another. In some instances, each of the nodes 110-1, 110-2, 110-3, 110-4 or multiple nodes 110-1, 110-2, 110-3, 110-4 are maintained by different entities. A distributed trust computing network 100 typically works without a central repository or single administrator.

A distributed trust computing network 100 provides numerous advantages over traditional storage networks/databases. A large number of the decentralized nodes 110-1, 110-2, 110-3, 110-4 of a trust network may reach a consensus regarding the validity of resources or data maintained with a block of the distributed trust computing network, in the context of the present invention the validity of the code change file or segments of the code change file on a distributed register/ledger 120 or the like.

The distributed trust computing network 100 typically has two primary types of records. The first type is the record type, which consists of the actual data stored in a block 130-1, 130-2, 130-3, 130-4 (shown in FIGS. 1-3) within a distributed register/ledger 120. The second type is the block type, which are records that confirm when and in what sequence certain events became recorded as part of the distributed trust computing network. Records, such as a code change file segment records, and the events associated therewith are created by participants using the distributed trust computing network in its normal course of business, for example, when code change file segment is determined, a data block(s) 230 is created by users known as "miners" who use specialized software/equipment to create data blocks 230. Holders of a data block 130-1, 130-2, 130-3, 130-4 of the distributed trust computing network agree to store the data block 130-1, 130-2, 130-3, 130-4 within the distributed trust computing network 100 and the related data clocks 130-1, 130-2, 130-3, 130-4 are passed around to various nodes 110-1, 110-2, 110-3 or 110-4 of the distributed trust computing network 100. A "valid" data block 130-1, 130-2, 130-3, 130-4 or related event is one that can be validated based on a set of rules that are defined by the particular system implementing the distributed trust computing network 100. For example, in the case of code change segment, a valid data block is one that authenticates data in the data block to which it is linked and/or the user/creator/owner of the data block and authorizes specific determined code change review entities to access at least a portion of the distributed register/ledger 120 to gain access to the data contained in the data block 130-1, 130-2, 130-3, 130-4.

A distributed trust computing network 100 is typically decentralized—meaning that a distributed register/ledger 120 (i.e., a decentralized register/ledger) is maintained on multiple nodes 110-1, 110-2, 110-3, 110-4 of the distributed trust computing network 100. In this regard, one node 110-1, 110-2, 110-3, or 110-4 in the distributed trust computing network 100 may have a complete or partial copy of the distributed register/ledger 120 or set of records and/or blocks 130-1, 130-2, 130-3, 130-4 on the distributed trust computing network 200. Transactions/events are initiated at a node 110-1, 110-2, 110-3, or 110-4 of a distributed trust computing network 100 and communicated to the various other nodes 110-1, 110-2, 110-3, 110-4 of the distributed trust computing network 100. Any of the nodes 110-1, 110-2, 110-3, 110-4 can validate the content of a data block 230 or an associated event, add the data block 230 and/or the contents of the data block 130-1, 130-2, 130-3, 130-4 to its copy of the distributed register/ledger 120, and/or broadcast the detail/data of the data block 130-1, 130-2, 130-3, 130-4, its associated validation (in the form of a block 130-1, 130-2, 130-3, 130-4) and/or other data to other nodes 130-1, 130-2, 130-3, 130-4.

Figure 2:
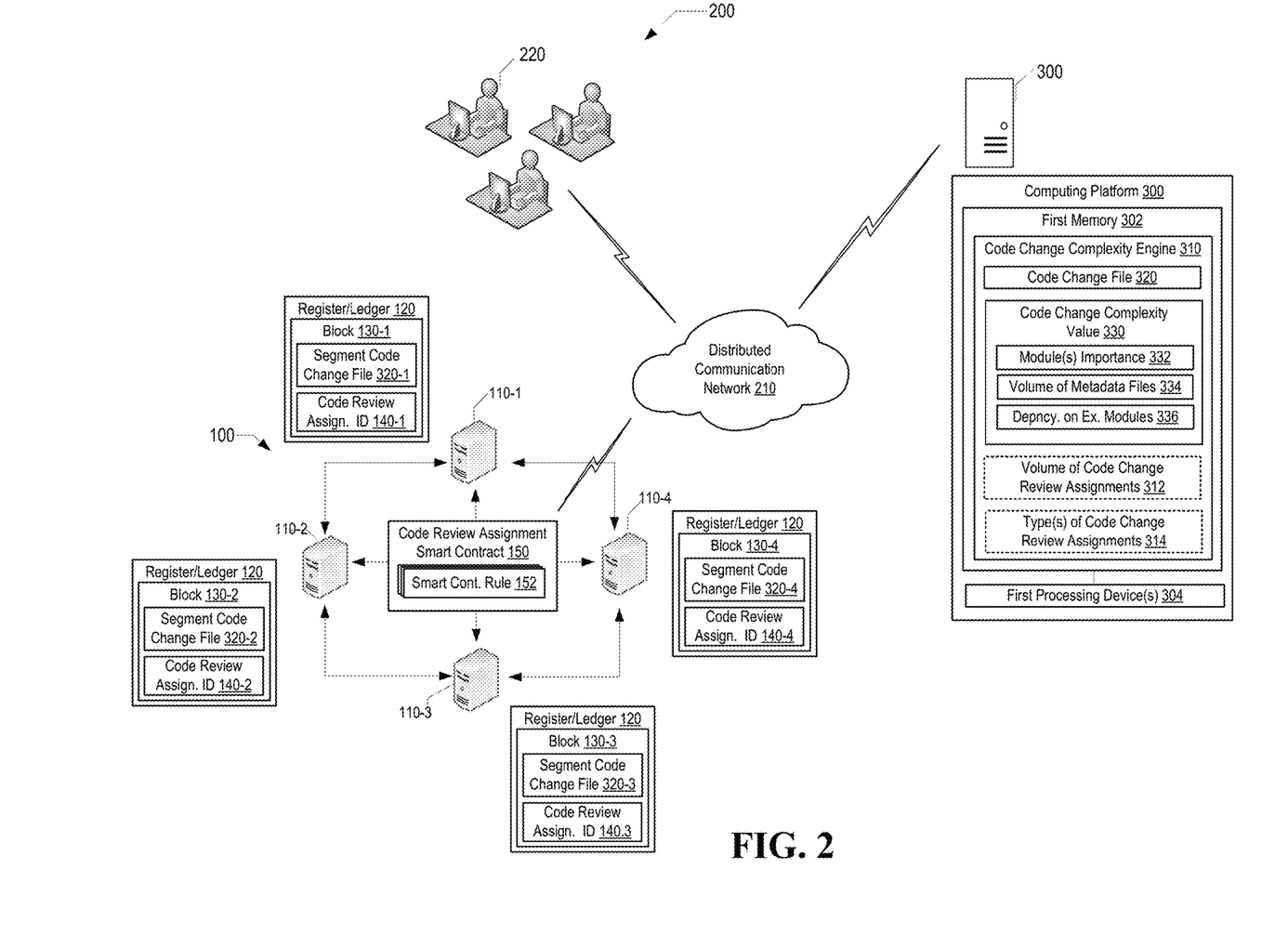
FIG. 2 is a schematic/block diagram of a system for intelligently determining code review assignments, in accordance with embodiments of the present invention.

Referring to FIG. 2, a schematic/block is depicted of a system 200 for dynamically determining a code change review assignments, in accordance with embodiments of the present invention. The system 200 is implemented in distributed communication network 210, such as the Internet, one or more intranets, one or more cellular networks or the like.

The system 200 includes a computing platform 300, which may comprise one or more computing devices/apparatus, such as servers or the like. The computing platform includes a first memory 302 and one or more first processing devices 304 in communication with first memory 302. First memory 302 stores code change complexity engine 310 that is executable by at least one of the first processing devices 304. The change code complexity engine 310 is configured to receive a code change file 320, commonly referred to as a "shelve", for a computing application. The computing application comprises one or more modules (i.e., a software component or part of a program that contains one or more routines), in which the code changes occur in one or more of the modules. In specific embodiments of the invention, the computing application is a customer relationship management (CRM) application or the like. Further, the change code complexity engine 310 is configured to determine a complexity value 330 for the code change file 320 based at least one (i) a level of importance 332 of the module(s) in which the changes occur with respect to the computing application, (ii) a volume of metadata files 334 impacted by the code changes, and (iii) dependency of the codes changes on external modules/computing applications 336.

In specific embodiments of the invention, the code change complexity value 330 is used to determine/identify the volume of code change review assignments 312 (i.e., whether a single reviewer 220 can be assigned to the code change file 320 or whether multiple reviewers 220 are needed to be assigned to the code change file 320). In other specific embodiments of the invention, the code change complexity value is used to determine the type of code change review assignments (i.e., the type of the reviewer, e.g., architect reviewer or the like).

The system 200 additionally includes a distributed trust computing network 100 comprising a plurality of decentralized nodes 110-1, 110-2, 110-3 and 110-3. Each decentralized nodes comprising a second memory (not shown in FIG. 2) and one or more second processing device (not shown in FIG. 2) in communication with the second memory. Additionally, the system 200 includes a code assignment smart contract 150 that is stored in the second memory and executable by the second processing device(s). The code assignment smart contract 150 is configured to, in response to the distributed trust computing network 100 receiving the code change file 320 and the code change complexity value 330, execute logic that is based on a plurality of smart contract rules 152 to determine segments 320-1, 320-2, 320-3, 320-4 of the code change file 320 and a code review assignment 140-1, 140-2, 140-3, 140-4 for each segment 320-1, 320-2, 320-3, 320-4, In response, the distributed trust computing network 100 is configured to generate data blocks 130-1, 130-2, 130-3, 130-4 within the distributed register/ledger 120, each data block 130-1, 130-2, 130-3, 130-4 comprising a determined segment 320-1, 320-2, 320-3, 320-4 and an identifier for the determined code review assignment 140-1, 140-2, 140-3, 140-4 for the corresponding segment 320-1, 320-2, 320-3, 320-4 of the code change file 320. Subsequently the assigned reviewer 220 is provided secured access to the assigned segments of the code change file 320, such as via the cryptography methodology discussed in greater detail infra. with regards to FIG. 5.

Figure 3:
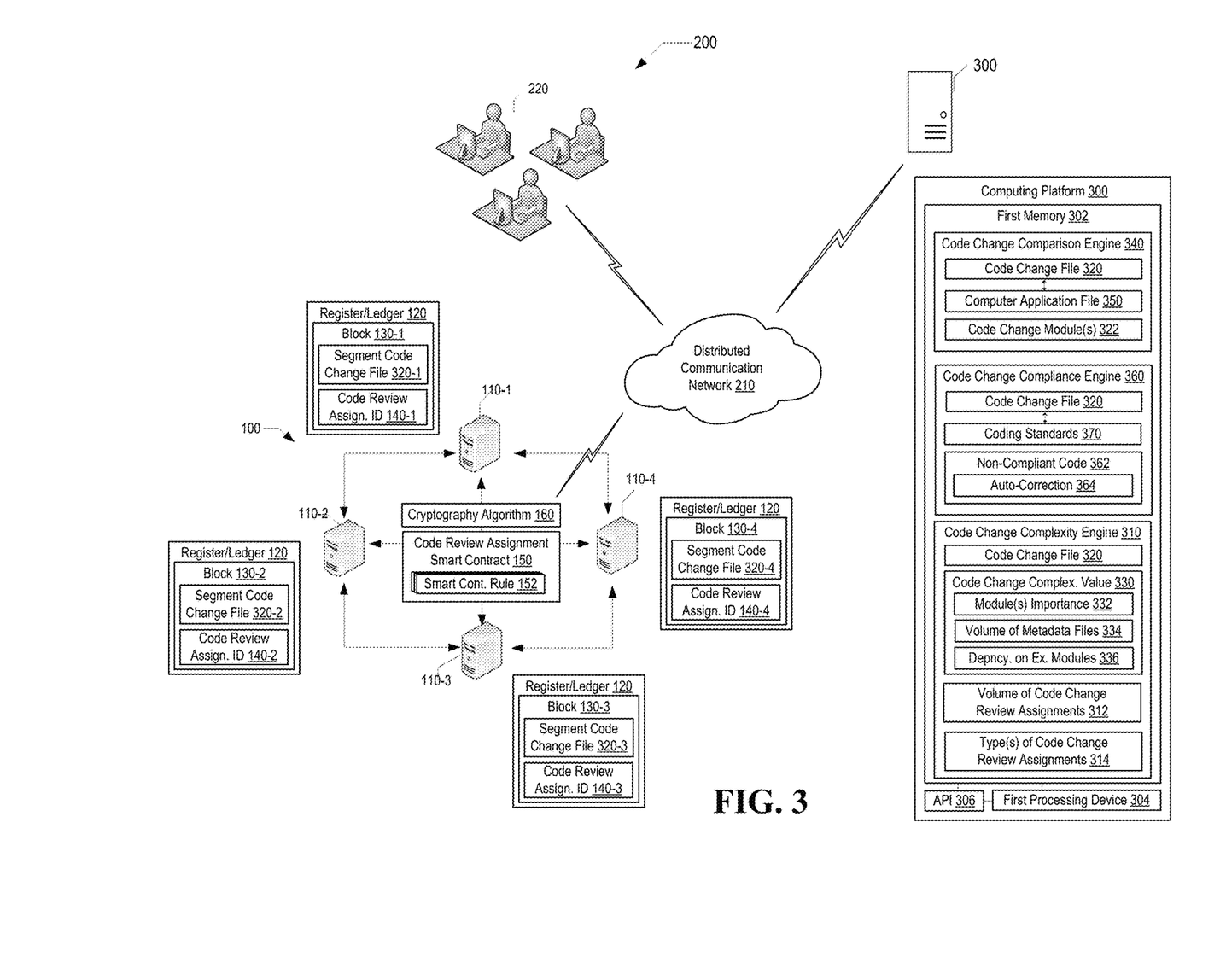
FIG. 3 is a schematic/block diagram of a system for intelligently determining code review assignments and providing secured access to the code change review assignments, in accordance with alternative embodiments of the present invention.

Referring to FIG. 3, a schematic diagram is depicted of a system 200 for determining code change review assignments, in accordance with embodiments of the present invention. In addition to providing greater detail, FIG. 3 highlights various alternate embodiments of the system 200. As previously discussed in relation to FIG. 2, system 200 includes computing platform 300, which may comprise one or more computing devices/apparatus, such as application server(s), storage servers or the like configured to execute software programs, including engines, instructions, algorithms, modules, routines, applications, tools and the like. Computing platform 300 includes first memory 302, which may comprise volatile and non-volatile memory, such as read-only and/or random-access memory (RAM and ROM), EPROM, EEPROM, flash cards, or any memory common to computer platforms). Moreover, first memory 302 may comprise cloud storage, such as provided by a cloud storage service and/or a cloud connection service.

Further, computing platform 300 also includes first processing device(s) 304, which may be an application-specific integrated circuit ("ASIC"), or other chipset, logic circuit, or other data processing device. First processing device 304 may execute an application programming interface ("API") 306 that interfaces with any resident programs, such as code change comparison engine 340, code change compliance engine 360 and code change complexity engine 310 and sub-engines/routines associated therewith or the like stored in the first memory 302 of the computing platform 300.

First processing device 304 may include various processing subsystems (not shown in FIG. 3) embodied in hardware, firmware, software, and combinations thereof, that enable the functionality of computing platform 300 and the operability of the computing platform 300 on distributed communication network 210. For example, processing subsystems allow for initiating and maintaining communications and exchanging data with other networked devices. For the disclosed aspects, processing subsystems of first processing device 304 may include any subsystem used in conjunction with code change comparison engine 340, code change compliance engine 360 and code change complexity engine 310 and related sub-engines/routines, algorithms, sub-algorithms, modules, sub-modules thereof.

Computing platform 300 additionally includes a communications module (not shown in FIG. 3) embodied in hardware, firmware, software, and combinations thereof, that enables electronic communications between computing platform 300 and other networks and/or networked devices. Thus, the communication module may include the requisite hardware, firmware, software and/or combinations thereof for establishing and maintaining a network communication connection with one or more networks, such as distributed trusts computing network 100 and devices, such as user devices associated with code change reviewers 220 or the like.

In specific embodiments of the system 200, first memory 302 of computing platform 300 stores code change comparison engine 340 that is executable by the first processing device(s) 304 and configured to receive the code change file 320 and compare it to the current/existing computer application file 350 to determine what is being changed in the computer application file 350 and, specifically, determine, based on the code index, which of the modules in the computer application 350 are code change modules 322 (i.e., modules in which the code changes occur).

In further specific embodiments of the system 200, first memory 302 of computing platform 300 stores code change compliance engine 360 that is executable by the first processing engine(s) 304 and configured to receive and scan the code change file with applicable coding standards 370 to determine whether the code changes comply to the applicable standards. If non-compliant issues result from the scan, code change compliance engine 360 is further implement an auto-correction 364 mechanism (i.e., auto-healing) that is configured to identify and implement resolutions to the non-compliant issues. The auto-correction 364 mechanism relies on machine learning techniques, such that the historical data associated with previous code change compliance review and auto-correction are analyzed for purposes of subsequent auto-correction. For example, if a coding standard 370 indicates that non-public information (NPI) is required to be marked, the auto-correction 364 mechanism/feature is configured to identify and mark the NPI in the code change file 320. In the event that the auto-correction 364 is unable to correct the non-compliant issues, the code change file 320 is returned to the developer with notification of the outstanding non-compliant issues.

As previously discussed in relation to FIG. 2, first memory 302 of computing platform 300 additionally stores change code complexity engine 310 is configured to receive a code change file 320 and determine a complexity value 330 for the code change file 320 based at least one (i) a level of importance 332 of the module(s) in which the changes occur with respect to the computing application, (ii) a volume of metadata files 334 impacted by the code changes, and (iii) dependency of the codes changes on external modules/computing applications 336. In specific embodiments of the invention, change code complexity engine 310 is trained with Support Vector Machine (SVM) learning, which is a machine learning method based on statistical learning theory. The SVM based training may, in specific embodiments, be semi-supervised, so that initially the complexity of code changes can be determined and subsequently the change code complexity engine 310 will self-learn and automatically assess complexity of the code changes. Further discussion related to details of the code change complexity engine 310 are provided in relation to the complexity table of FIG. 6, infra. As previously discussed, in specific embodiments of the invention, the code change complexity value 330 is used to determine/identify the volume of code change review assignments 312. In other specific embodiments of the invention, the code change complexity value is used to determine the type of code change review assignments (i.e., the type of the reviewer, e.g., architect reviewer or the like).

Once the complexity value 330 has been determined, the code change file 320 and complexity value 330 are communicated to the distributed trust computing network 100, such as a Ethereum® network or the like. The distributed trust computing network 100 provides for a cryptography algorithm 160 to be implemented, which executes a hash algorithm to generate a has value and uses the hash value to generate a private encryption key. In specific embodiments of the system 200, the complexity value 330 is used as an input for the hash algorithm. The private key is used to digitally sign the code change file 320 and/or data blocks 130 in the distributed register/ledger 120 containing segments of the code change file 320. Subsequently, reviewers, which have access to the distributed trust computing network 100, implement the hash algorithm to generate a public encryption key and, if the public encryption key matches the private encryption key the digital signature is deemed valid and the reviewer is provided access to the code change file or segment(s) of the code change file (i.e., the reviewer is able to "unlock" the code change file or segment(s) of the code change file. Further details of the cryptography methodology are provided infra. with regards to FIG. 5.

As previously discussed in relation to FIG. 2, the system 200 additionally includes a distributed trust computing network 100 comprising a plurality of decentralized nodes 110-1, 110-2, 110-3 and 110-3. Each decentralized nodes comprising a second memory (not shown in FIG. 3) and one or more second processing device (not shown in FIG. 3) in communication with the second memory. Additionally, the system 200 includes a code assignment smart contract 150 that is stored in the second memory and executable by the second processing device(s). The code assignment smart contract 150 is configured to, in response to the distributed trust computing network 100 receiving the code change file 320 and the code change complexity value 330, execute logic that is based on a plurality of smart contract rules 152 to determine segments 320-1, 320-2, 320-3, 320-4 of the code change file 320 and a code review assignment 140-1, 140-2, 140-3, 140-4 for each segment 320-1, 320-2, 320-3, 320-4. The smart contract rules 152 may include, but are not limited to, (1) rule(s) based on the history of objects/classes, (2) rule(s) based on the complexity of the code changes (i.e., the complexity value), (3) rule(s) based on the dependency on other modules/computing applications, and (4) rule(s) based on the type of code changes (e.g., code changes of a specific type should be assigned to a reviewer associated with those type of changes). The distributed trust computing network 100 is further configured to generate data blocks 130-1, 130-2, 130-3, 130-4 within the distributed register/ledger 120, each data block 130-1, 130-2, 130-3, 130-4 comprising a determined segment 320-1, 320-2, 320-3, 320-4 and an identifier for the determined code review assignment 140-1, 140-2, 140-3, 140-4 for the corresponding segment 320-1, 320-2, 320-3, 320-4 of the code change file 320.

Figure 4:
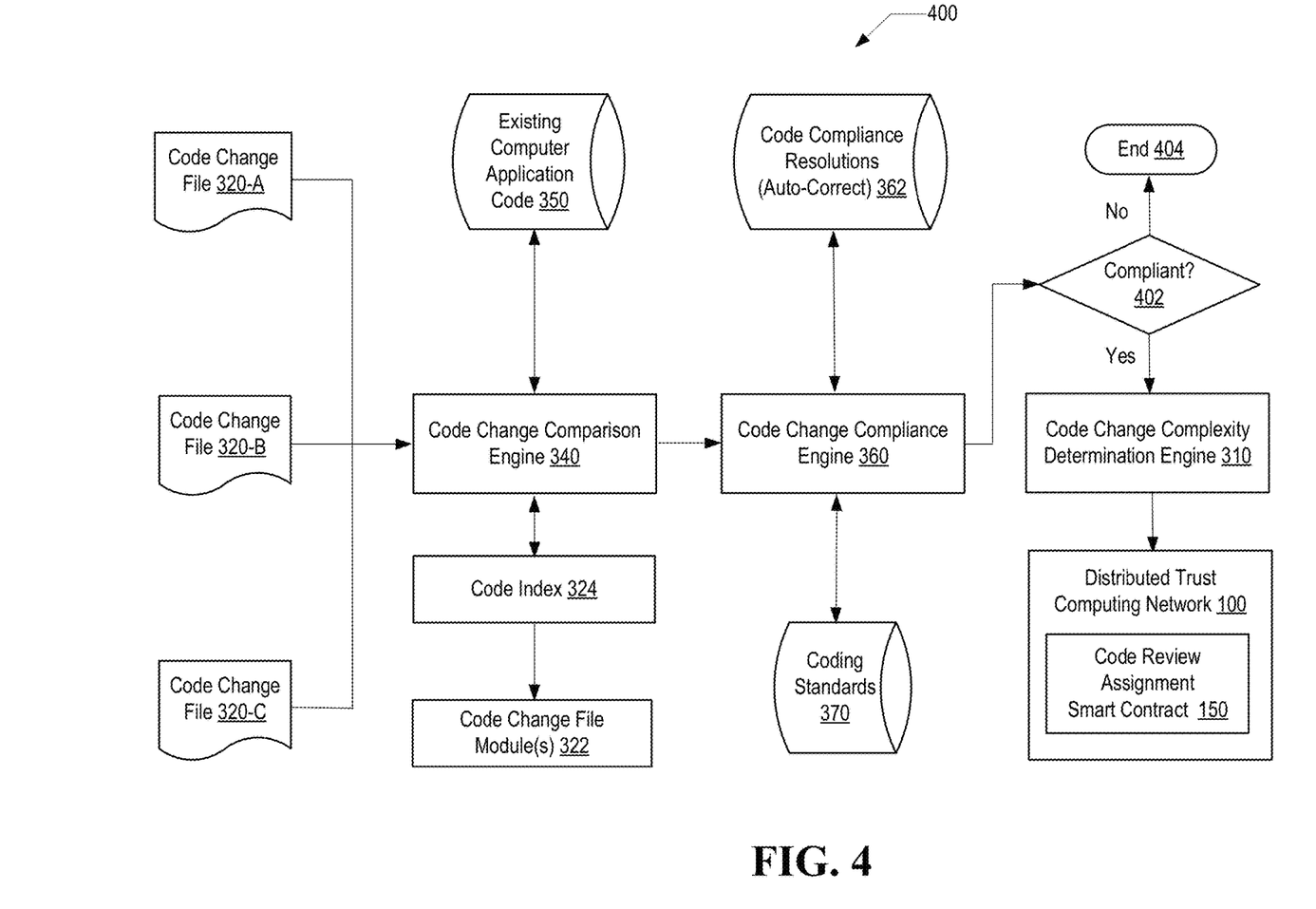
FIG. 4 is a flow diagram of a methodology for intelligently determining code change review assignments, in accordance with embodiments of the present invention.

Referring to FIG. 4, a flow diagram is depicted of a method for intelligent code review assignment, in accordance with embodiments of the present invention. Code change files 320-A, 320-B, 320-C are submitted from various different developers. The developers may be specific to one or more modules (i.e., lead developer of a module) of the computing applications and, thus, the code changes may be specific to those modules. In other instance, the developers may not be specific to any one module and, thus, the code changes in any one or more of the modules.

The code change comparison engine 340 receives the code change files 320-A, 320-B and 320-C and compares the code change files 320-A, 320-B and 320-C to the current revision of the computer application code 350 to determine, based on code indices 324, the modules 322 of the code change file in which the changes occur.

Further, the code change compliance engine 360 receives the code change files 320-A, 320-B and 320-C and scans the file in accordance with applicable coding standards 370 to determine whether the code changes comply with the applicable standards. In response to determining that the code changes do not comply with the applicable coding standards, an attempt is made to identify and implement code compliance resolutions 362 as a means of auto-correcting/healing the non-compliances.

At Decision 402, a determination is made as to whether the code change file 320-A, 320-B and 320-C is compliant (i.e., meets all applicable standards or has undergone auto-correct/heal and subsequently meets all applicable standards). If a code change file 320-A, 320-B, or 320-C is determined to be non-compliant, the code change file is returned to the developer and the process ends. If the code change files 320-A, 320-B and 320-C are determined to be compliant, they are subsequently subjected to a complexity determination via code change complexity determination engine 310. As previously discussed, the code change complexity determination engine 310 determines a complexity value for a corresponding code change file that is based at least on (i) a level of importance of the module(s) in which change occurs with respect to the computer application, (ii) a volume of metadata files impacted by the code changes, and (iii) the dependency of the code changes on external modules/computer applications.

Once the complexity determination has been completed, the code change files 320-A, 320-B and 320-C and corresponding complexity value are communicated to the distributed trust computing network 100. The logic within code review assignment smart contract 150 is executed based on predetermined smart contract rules to determine segments of the code change file and code review assignments for each of the segments of the code change file. Subsequently, the distributed trust computing network generates data blocks of a distributed ledger/register, such that each data block includes a determined segment of the code change file and identifies the determined code change review assignment.

Figure 5:
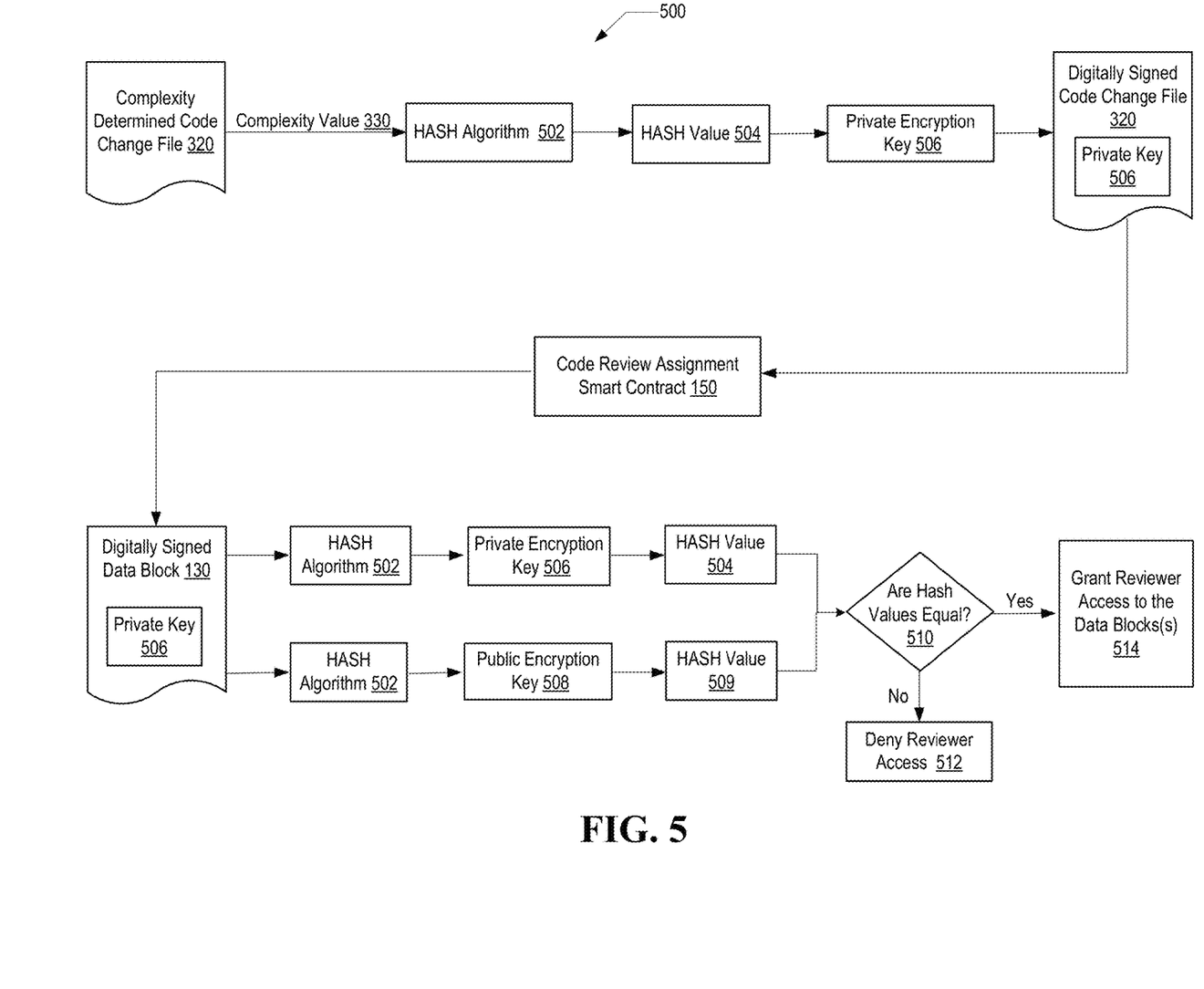
FIG. 5 is a flow diagram of a methodology for providing secure access to code change review assignments, in accordance with embodiments of the present invention.

Referring to FIG. 5, a flow diagram is depicted of a method 500 for secure reviewer access to code change files, in accordance with embodiments of the present invention. Once the code change file 320 has undergone complexity determination, the code change file 320 and the complexity value 330 are communicated to the distributed trust computing network 100 at which a hash algorithm 502 is executed to determine a hash value 504. In specific embodiments of the invention, the complexity value 330 serves an at least one of the inputs to the hash algorithm 502. The hash value 504 is used to determine a private encryption key 506, which digitally signs 504 the code change file 320.

Subsequently, the digitally signed code change file 320 is communicated to the code review assignment smart contract 150 where segments of the code change file 320 are determined and code review assignments are determined for each of the segments of the code change file 320. The distributed trust computing network generates data blocks 130 that are digitally signed with the private encryption key 506 and include a determined segment of the code change file and identify the code review assignment.

When the reviewer assigned to review the segment(s) of the code review file accesses the distributed trust computing network, they will present a public encryption key 508, which has previously been communicated to the reviewer. The public encryption key 508 and the private encryption key 506 used to digitally sign the data block(s) 130 will be applied to the hash algorithm 502 to determine corresponding hash values 504, 509. At Decision 510, a determination is made as to whether the hash values 504, 509 determined from the public and private encryption keys 508, 506 are equal (i.e., match). If the hash values 504, 509 do not match, at Event 512, the reviewer is denied access to the data blocks 130. If the hash values 504, 509 do match, at Event 514, the reviewer is granted access to the data blocks (i.e., the segments of the code change file assigned to the reviewer).

Figure 6:
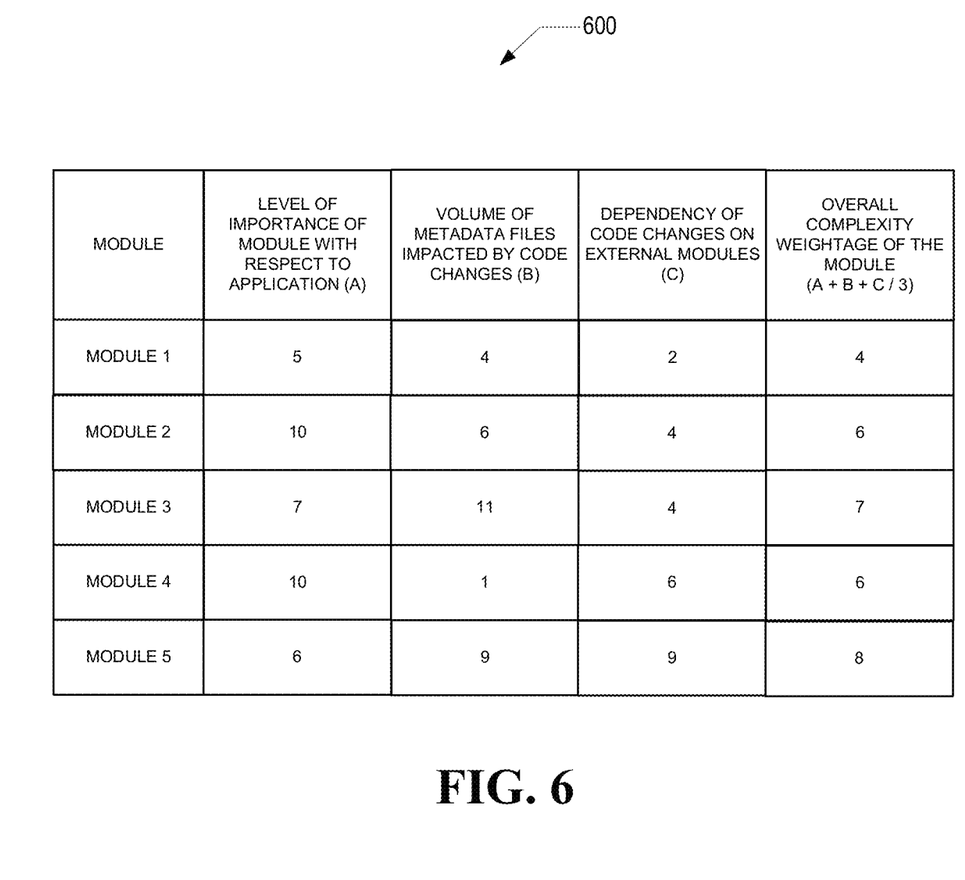
FIG. 6 is an exemplary code change complexity determination table used to determine code change complexity; in accordance with embodiments of the present invention.

Referring to FIG. 6, an exemplary complexity determination table 600 is depicted for determining a code change complexity value for a code change file, in accordance with embodiments of the present invention. In accordance with the illustrated example, the code change file has changes occurring in five modules (i.e., Modules 1-Module 5). A specific weightage value is assigned to three individual categories (A) a level of importance of the module with respect to the application, (B) a volume of metadata files impacted by the code changes in the module, and (C) the dependency of the code changes in the module on external modules/computing applications. Once the weightage values have been assigned to each of the three categories, an overall complexity weightage is determined for each of the categories by summing the weightage values of the individual categories and dividing the sum by the number of individual categories. In the illustrated example, Module 5 has the highest complexity weightage, Module 3 has the next highest complexity weightage, Modules 2 and 4 have equal complexity weightage and Module 1 has the lowest complexity weightage. The overall complexity weightage of the modules is subsequently used to determine an overall complexity value for the code change file. In specific embodiments of the invention, the complexity value of the code change file is determined by summing the overall complexity weightage of the modules in which change occurs.

Figure 7:
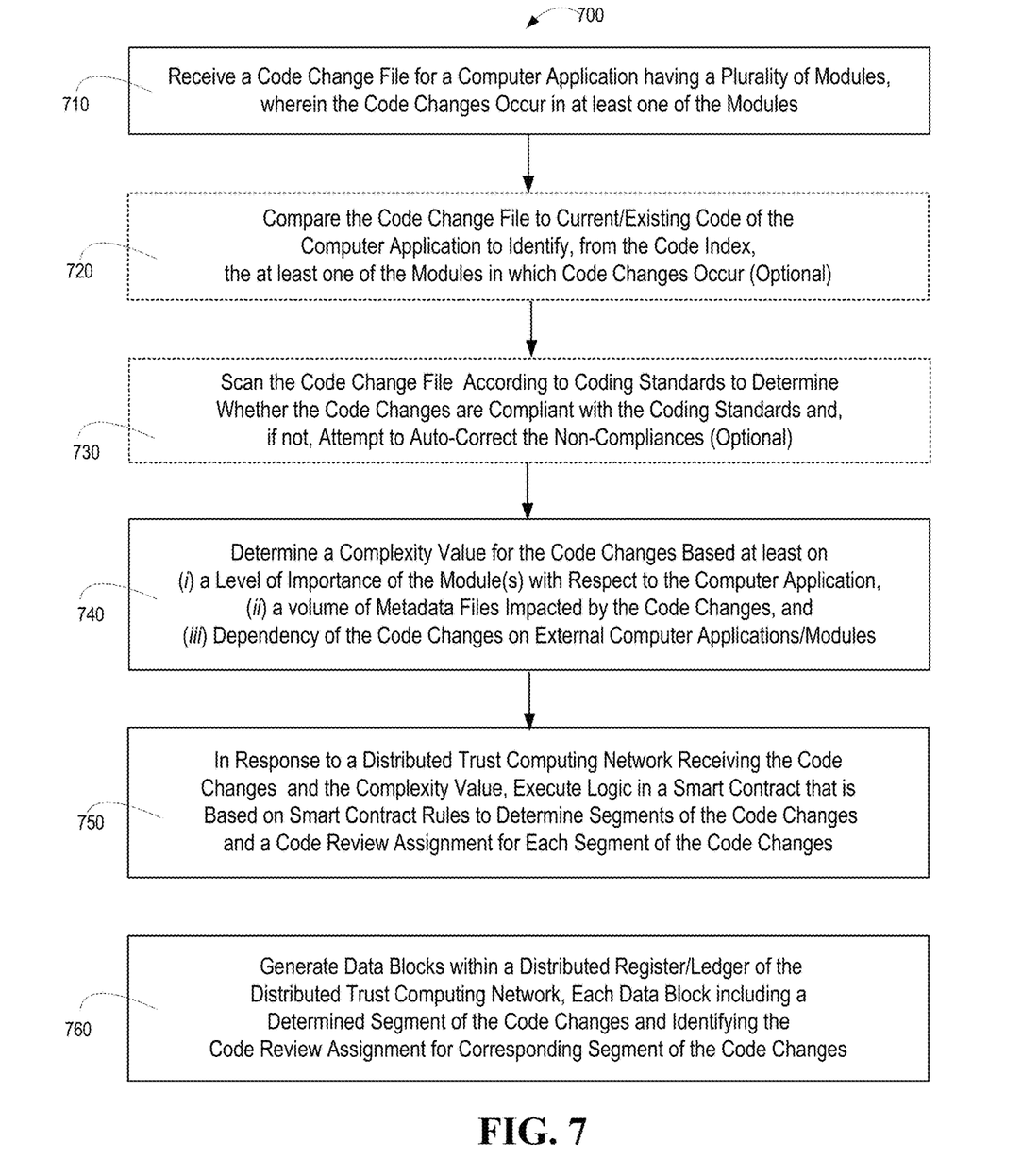
FIG. 7 is a flow diagram of a method for intelligently determining code change review assignments, in accordance with embodiments of the present invention.

Referring to FIG. 7, a flow diagram is depicted of a method for intelligently determining code change review assignments, in accordance with embodiments of the present invention. At Event 710, a code change file is received for a computer application that includes a plurality of modules, such that the code changes occur in one or more of the modules. The code change file may be received from a developer who desires to "check-in" the code changes. In specific embodiments of the invention, the computer application is a Customer Relationship Management (CRM) application or the like.

At optional Event 720, the code change file is compared to the current/existing revision of the computer application to identify, based on code indices, the modules in which the changes occur.

At Optional Event 730, the code change file is scanned according to coding standards applicable to the computing application to determine whether the code changes are compliant with the applicable coding standards. If the determination is made that the code changes are not compliant with the applicable coding standards, an attempt is made to auto-correct/heal the non-compliances by identifying and implementing applicable non-compliance resolutions. If the auto correct/heal is unsuccessful, the code change file and a notification indicating the reasons for non-compliance are communicated back to the developer. If the code changes are determined to be compliant to the applicable coding standards, subsequent events in the method ensue.

At Event 740, a complexity value is determined for the code changes based at least on (i) a level of importance of the module(s) in which change occurs with respect to the computer application, (ii) a volume of metadata files impacted by the code changes, and (iii) the dependency of the code changes on external modules/computer applications. In specific embodiments of the method, the complexity value determination is used to determine the volume/number of reviewers required to review the code change file and/or the type of reviewers required to review the code change file.

At Event 750, in response to the code change file and the complexity value being communicated to a distributed trust computing network (e.g., block chain network), logic within a code change assignment smart contract is executed based on predetermined smart contract rules to determine segments of the code change file and a code review assignment for each determined segment of the code change file. The rules may include, but are not limited to, (i) the history of objects/classes, (ii) complexity of the code change file, (iii) dependency of the code changes on other modules and (iv) type of changes on the code change file. In specific embodiments of the invention, the code change file is subjected to cryptography within the distributed trust computing network, such that the code change file is digitally signed with a private encryption key that is based on a hash value.

At Event 760, the distributed trust computing network generates data blocks within a distributed ledger/register. Each data block including a determined segment of the code change file and identifying the code review assignment for the corresponding segment of the code change file. In this regard, reviewers who access to the distributed trust computing network, can access their respective code review assignment. In specific embodiments access is granted via generation/presentation of a public encryption key, the hash value of which must match the hash value of the private encryption key to validate the signature on the data block and grant access to the reviewer.

Thus, present embodiments of the invention provide systems, methods, computer program products and/or the like for intelligent determination of code change review assignments and subsequent secured access to the determined code change review assignments. Specifically, code changes undergo code change complexity determination which is based at least on (i) a level of importance of the module(s) in which the changes occur in relation to the computing application, (ii) the volume/quantity of metadata files impacted by the code changes, and (iii) the dependency of the code changes on other external modules/computing applications. Additionally, a distributed trust computing network is implemented and a code change smart contract which relies on a plurality of smart contract rules is used to determine and allocate code change review assignments. In this regard, data blocks within a distributed ledger define individual segments/portions of the code change file with each data block having a code change review assignment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secured computing code review assignment, the system comprising:
   a computing platform including a first memory and one or more first processing devices in communication with the memory;
   a code change complexity determination engine stored in the first memory, executable by the one or more first processing devices and configured to:
      receive a code change file for a computer application having a plurality of modules, wherein code changes occur in at least one of the modules, and
      determine a complexity value for the code change file based at least on (i) a level of importance of the at least one of the modules with respect to the computer application, (ii) quantity of metadata files impacted by the code changes, and (iii) dependency of the code changes on external computing applications;
   a cryptography engine stored in the first memory, executable by the first processing device and configured to:
      receive the complexity value as an input to a hash algorithm,
      generate a first hash value as a result of executing the hash algorithm,
      generate a private encryption key based on the first hash value, and digitally sign the code change file with the private encryption key;
   a distributed trust computing network comprising a plurality of decentralized nodes, each decentralized node comprising a second memory and at least one second processing device in communication with the second memory; and
   a code assignment smart contract stored in the second memory, executable by the second processing devices, and configured to:
      in response to the distributed trust computing network receiving the digitally signed code change file and the complexity value, execute logic in the smart contract based on a plurality of smart contract rules and the complexity value to determine segments of the code change file and a code review assignment for each segment of the code change file,
   wherein the distributed trust computing network is configured to generate a plurality of data blocks within a distributed register, each data block (i) comprising a determined segment of the code change file, (ii) identifying the code review assignment for the corresponding segment of the code change file, and (iii) digitally signed with the private encryption key, wherein a plurality of the decentralized nodes validate the plurality of data blocks on the distributed ledger.

2. The system of claim 1, further comprising a code change comparison engine stored in the first memory, executable by the one or more first processing devices and configured to:
   compare the code changes to currently existing code of the computer application to identify, from the code index, the at least one of the modules in which the code changes occur.

3. The system of claim 2, further comprising a code change compliance engine stored in the first memory, executable by the first processing device and configured to:
   scan the code change file with coding standards to determine whether the code changes are compliant with the coding standards, and
   in response to determining that the code changes are compliant with the coding standards, communicate the code change file to the code change complexity determination engine.

4. The system of claim 3, wherein the code change compliance engine is further configured to:
   in response to scanning the code change file and identifying one or more non-compliances, (i) identify a coding resolution for the one or more non-compliances, and (ii) implement the coding resolution to auto-correct the one or more non-compliances.

5. The system of claim 3, wherein the code change compliance engine is a self-learning engine configured to identify addition of new modules to the computing application and updated or new coding standards.

6. The system of claim 1, wherein the code change complexity engine is further configured to determine at least one (i) a quantity of code review assignments for the code change file, and (ii) a type of code reviewer for the code review assignment.

7. The system of claim 1, wherein
a reviewer assigned to review the segment of the code change file implements a public key and the hash algorithm to generate a second hash value and validates the digital signature of assigned data blocks based on the first and second hash values being equivalent.

8. The system of claim 1, wherein the code assignment smart contract is configured to execute the logic in the smart contract based on a plurality of smart contract rules, wherein the plurality of smart contract rules include one or more of (i) a rule associated with a history of the objects and classes in the computer application, (ii) a rule based on a complexity of the code changes, (iii) a rule based on the dependency of the modules in the computer application to other external modules in other external computing applications, and (iv) a rule based on code change types being a basis for code review assignment.

9. The system of claim 1, wherein the computer application is further defined as a Customer Relationship Management (CRM) application.

10. A computer-implemented method for secured computing code review assignment, the method executed by one or more processing devices and comprising:
receiving a code change file for a computer application having a plurality of modules, wherein code changes occur in at least one of the modules; and
determining a complexity value for the code change file based at least on (i) a level of importance of the at least one of the modules with respect to the computer application, (ii) quantity of metadata files impacted by the code changes, and (iii) dependency of the code changes on external computing applications;
receiving the complexity value as an input to a hash algorithm;
generating a first hash value as a result of executing the hash algorithm;
generating a private encryption key based on the first hash value;
digitally signing the code change file with the private encryption key;
in response to a distributed trust computing network receiving the digitally signed code change file and the complexity value, executing logic in a smart contract that is based on a plurality of smart contract rules and the complexity value to determine segments of the code change file and a code review assignment for each segment of the code change file; and
generating, within the distributed trust computing network, a plurality of data blocks within a distributed register, each data block (i) comprising a determined segment of the code change file, (ii) identifying the code review assignment for the corresponding segment of the code change file, and (iii) digitally signed with the private encryption key, wherein a plurality of decentralized nodes validate the plurality of data blocks on the distributed ledger.

11. The method of claim 10, further comprising:
comparing the code changes to currently existing code of the computer application to identify, from the code index, the at least one of the modules in which the code changes occur.

12. The method of claim 10, further comprising:
scanning the code change file with coding standards to determine whether the code changes are compliant with the coding standards; and
in response to determining that the code changes are compliant with the coding standards, communicate the code change file to the code change complexity determination engine.

13. The method of claim 12, further comprising:
identifying one or more non-compliances in the code changes;
identifying a coding resolution for the one or more non-compliances; and
implementing the coding resolution to auto-correct the one or more non-compliances.

14. The method of claim 10, further comprising:
determining, based on the complexity value, at least one (i) a quantity of code review assignments for the code change file, and (ii) a type of code reviewer for the code review assignment.

15. The method of claim 10, wherein the plurality of smart contract rules include one or more of (i) a rule associated with a history of the objects and classes in the computer application, (ii) a rule based on a complexity of the code changes, (iii) a rule based on the dependency of the modules in the computer application to other external modules in other external computing applications, and (iv) a rule based on code change types being a basis for code review assignment.

16. A computer program product comprising:
a non-transitory computer-readable medium comprising:
a first set of codes for causing a computer to receive a code change file for a computer application having a plurality of modules, wherein code changes occur in at least one of the modules; and
a second set of codes for causing a computer to determine a complexity value for the code change file based at least on (i) a level of importance of the at least one of the modules with respect to the computer application, (ii) quantity of metadata files impacted by the code changes, and (iii) dependency of the code changes on external computing applications;
a third set of codes for causing a computer to receive the complexity value as an input to a hash algorithm, generate a first hash value as a result of executing the hash algorithm, generate a private encryption key based on the first hash value, and digitally sign the code change file with the private encryption key;
a fourth set of codes for causing a computer to, in response to a distributed trust computing network receiving the digitally signed code change file and the complexity value, execute logic in a smart contract that is based on a plurality of smart contract rules and the complexity value to determine segments of the code change file and a code review assignment for each segment of the code change file; and
a fifth set of codes for causing a computer to generate a plurality of data blocks within a distributed register, each data block (i) comprising a determined segment of the code change file, (ii) identifying the code review assignment for the corresponding segment of the code change file, and (iii) digitally signed with the private encryption key, wherein a plurality of the decentralized nodes validate the plurality of data blocks on the distributed ledger.

17. The computer program product of claim 16, further comprising:
- a sixth set of codes for causing a computer to compare the code changes to currently existing code of the computer application to identify, from the code index, the at least one of the modules in which the code changes occur; and
- a seventh set of codes for causing a computer to (i) scan the code change file with coding standards to determine whether the code changes are compliant with the coding standards, and (ii) in response to determining that the code changes are compliant with the coding standards, communicate the code change file to the code change complexity determination engine.

18. The computer program product of claim 17, wherein the seventh set of codes are further configured to cause the computer to
- (i) identify one or more non-compliances in the code changes, (ii) identify a coding resolution for the one or more non-compliances, and
- (iii) implement the coding resolution to auto-correct the one or more non-compliances.

19. The computer program product of claim 16, further comprising sixth set of codes for causing a computer to determine, based on the complexity value, at least one (i) a quantity of code review assignments for the code change file, and (ii) a type of code reviewer for the code review assignment.

* * * * *